United States Patent
Capewell

(10) Patent No.: US 7,024,074 B2
(45) Date of Patent: Apr. 4, 2006

(54) SYSTEM AND METHOD FOR PACKAGING A MONITOR PHOTODIODE WITH A LASER IN AN OPTICAL SUBASSEMBLY

(75) Inventor: Dale L. Capewell, Agoura Hills, CA (US)

(73) Assignee: Intel Corporation, Santa Clara, CA (US)

( * ) Notice: Subject to any disclaimer, the term of this patent is extended or adjusted under 35 U.S.C. 154(b) by 13 days.

(21) Appl. No.: 11/091,310

(22) Filed: Mar. 28, 2005

(65) Prior Publication Data

US 2005/0169576 A1    Aug. 4, 2005

Related U.S. Application Data

(62) Division of application No. 10/261,227, filed on Sep. 30, 2002.

(51) Int. Cl.
   *G02B 6/26* (2006.01)
(52) U.S. Cl. .......................... 385/31; 385/36
(58) Field of Classification Search ............... 385/36, 385/31
   See application file for complete search history.

(56) References Cited

U.S. PATENT DOCUMENTS

| | | | |
|---|---|---|---|
| 5,282,080 A | 1/1994 | Scifres et al. | 359/344 |
| 5,696,862 A | 12/1997 | Hauer et al. | 385/88 |
| 5,708,743 A | 1/1998 | DeAndrea et al. | 385/88 |
| 5,997,185 A | 12/1999 | Kropp | 385/89 |
| 6,631,222 B1 | 10/2003 | Wagener et al. | 385/16 |
| 6,668,104 B1 | 12/2003 | Mueller-Fiedler et al. | 385/12 |
| 6,751,379 B1 | 6/2004 | Capewell et al. | 385/36 |
| 2003/0108285 A1 | 6/2003 | Mine et al. | 385/36 |
| 2003/0161603 A1 | 8/2003 | Nadeau et al. | 385/137 |

FOREIGN PATENT DOCUMENTS

WO    WO 00/13051    9/2000

*Primary Examiner*—Sung Pak
(74) *Attorney, Agent, or Firm*—Pillsbury Winthrop Shaw Pittman LLP

(57) ABSTRACT

A system and method of monitoring a laser output power and laser extinction ratio includes an optical subassembly physically placed between a point light source and a optical fiber device. The optical subassembly creates a convergent light beam by reflecting a collimated light beam from the point light source off an interior surface of a first side of the optical subassembly. The optical subassembly creates an incident ray of the convergent light beam by including on a second side of the optical subassembly a wedge-shaped air gap.

21 Claims, 6 Drawing Sheets

SYSTEM AND METHOD FOR PACKAGING A MONITOR PHOTODIODE WITH A LASER IN AN OPTICAL SUBASSEMBLY

This application is a divisional application of utility application Ser. No. 10/261,227, filed Sep. 30, 2002.

BACKGROUND

1. Technical Field

The system and method described herein relates to monitoring the average optical power output and the extinction ratio of a point light source.

2. Discussion of the Related Art

Optical telecommunication systems include the use of point light sources, e.g., lasers, to transmit information at high speeds through optical fibers. The threshold current and slope efficiency of typical point light sources vary due to age and changes in operating temperature. In order to control the average optical power output of the point light sources, photodetectors are placed in a control feedback loop to monitor the optical output of the laser. If the signal received by the photodiode should fall, for example, the electrical current supplied to the laser would be increased to compensate.

Point light source and monitor photodetector combinations may be mounted in a specially designed package which has a mounting base with insulated connector leads and a sealed cover. The cover may include a window of glass, or other transparent material over a central portion of the top such that the window is aligned with the emitting aperture of the point light source device. In some point light source and photodetector combinations, reflected light from the window of the glass is received by the photodetector. Because the light fluence or power in these systems is generally small and unfocused, large photodiodes are needed to gather enough light to provide a sufficient signal-to-noise ratio (SNR) to maintain the constant average optical output from the laser. Unfortunately, large area detectors have low electrical bandwidth, making them unsuitable for tracking the high speed modulation of the laser. Instead, they are limited to use as time-average power monitors.

Changes in the slope efficiency of the laser with temperature and age also affect the extinction ratio of the point light source output. The extinction ratio of a point light source is the optical power of the "one" state divided by the optical power of the zero state. In systems employing large area monitor photodetectors, the change in extinction ratio is generally ignored or corrected using a look-up table based on data obtained by characterizing lasers similar to those used in the system of interest. Alternatively, the superposition of a pilot tone, at a frequency within the bandwidth of the monitor photodetector, onto the data may be used to correct changes in the extinction ratio of the point light source. This approach, based on the principle that the amplitude of the received pilot tone is proportional to the amplitude of the data modulation, has the drawback of modulating the extinction ratio of the transmitted data as well, thereby introducing extra noise.

DETAILED DESCRIPTION

Figure 1:
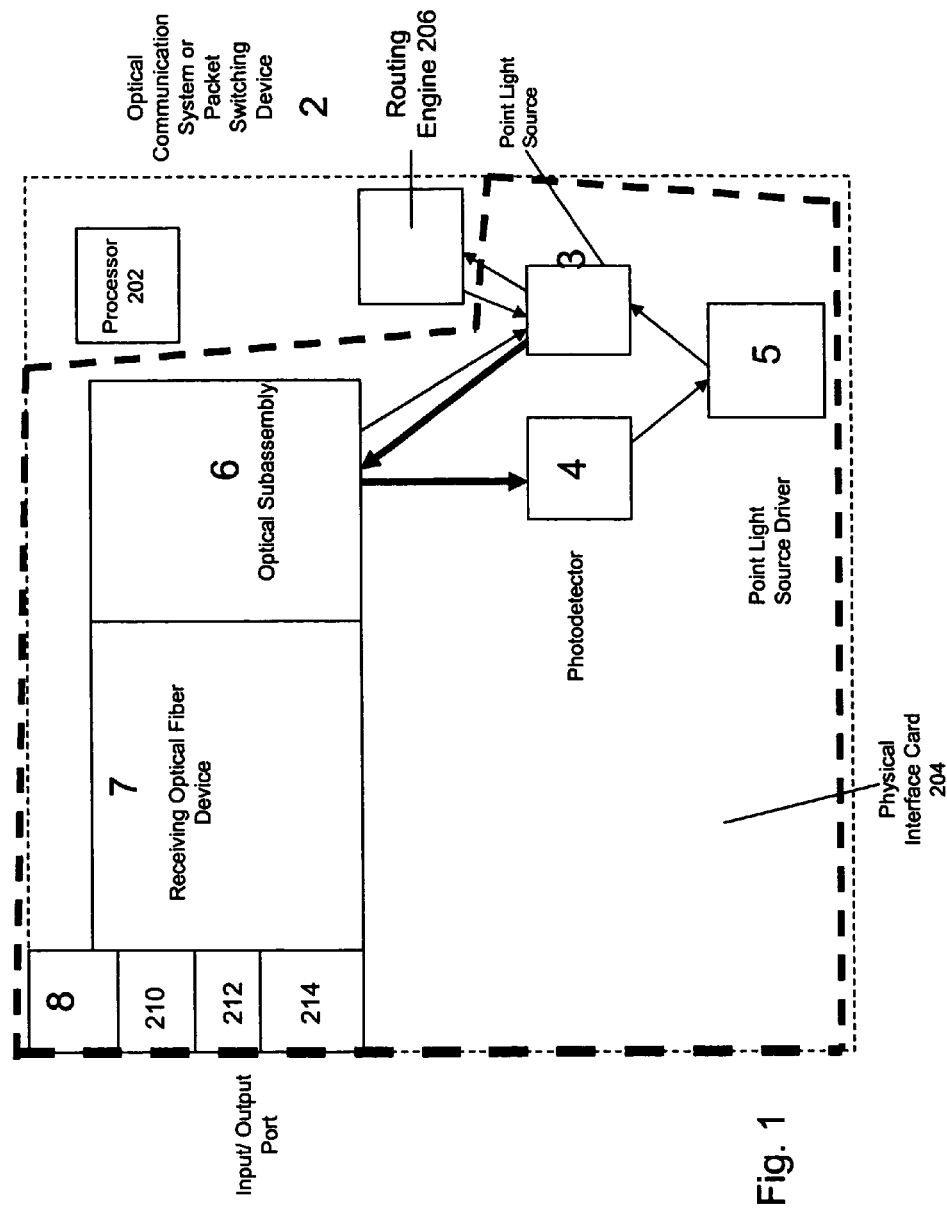
FIG. 1 illustrates an optical communications system according to an embodiment of the present invention.

A present embodiment provides a system and method for packaging a monitor photodetector with a point light source in an optical communication system such that a portion of light from the point source is reflected and focused onto the monitor photodetector. FIG. 1 illustrates an optical communications system according to an embodiment of the monitor photodetector packaged with a point source. The optical communication system 2 may include a point light source 3, a photodetector 4, a point light source driver 5, an optical subassembly 6, a receiving optical fiber device 7, and an output port 8.

The point light source 3 may be a laser. In one embodiment of the present invention, the point light source 3 may be a vertical cavity surface emitting laser (VCSEL). The point light source driver 5 may transmit an electrical signal, such as a current signal, to the point light source 3 to provide power for the point light source 3. The point light source driver 5 and the point light source 3 may be placed in a closed feedback loop with a photodetector 4 to allow the photodetector 4 to monitor the average output power and the extinction ratio of the point light source 3. The point light source driver 5, the point light source 3, and the photodetector 4 may all reside on a common substrate. In another embodiment, the point light source driver 5 may reside on a separate substrate from the point light source 3 and the photodetector 4.

The optical subassembly 6 may be physically placed between the light point source 3 and the receiving optical fiber device 7. In one embodiment of the present invention, the optical subassembly 6 may be composed of optically transparent plastic. In alternative embodiments, the optical subassembly may be made of a polycarbonate, such as LEXAN™, or a polyetherimide, such as ULTEM™. The optical subassembly 6 may assist in aligning a point light beam from the point light source 3 to the receiving optical fiber device 7. In addition, the optical subassembly 6 may, where it is attached to the receiving optical fiber device 7, include a wedge-shaped air gap to create a reflected incident ray of the point light beam. The incident ray of the point light beam may be transmitted back to a photodetector 4. The incident ray of the point light beam may be focused by a lens and thereby received by the photodetector 4 at a relatively large fluence, allowing a small area photodetector 4 to simultaneously track changes in the extinction ratio as well as changes in the average optical power over time. In one embodiment of the present invention, the lens used to focus the incident ray is the same as the lens used to focus the point light beam onto the core of the optical fiber device 7.

The photodetector 4 may receive the incident ray of the light point beam producing a photocurrent that is proportional to incident optical power, i.e., watts. The photocurrent modulation amplitude and average value may provide feedback information to the point light source driver 5 which changes its output signal to the point light source 3 in response to the feedback information.

The light point beam received at the receiving optical fiber device 7 may be transmitted through the receiving optical fiber device 7 to an output port 8. The output port 8 may be used to connect the receiving optical fiber device 7 to a transmission optical fiber device (not shown). In one embodiment of the present invention, the optical communication system 2 may be a packet switching device such as a network switch or a router, as illustrated in FIG. 1. The packet switching device 2 may include a processor 202, a physical interface card 204, and a routing engine 206. The physical interface card 204 may receive signals representing a plurality of packets at one of a plurality of input/output ports 8 210 212 214. The physical interface card 204 may forward the plurality of packets to a routing engine 206. The routing engine 206 may receive the plurality of packets, decide the next step for the plurality of packets, and transmit the plurality of packets to a selected I/O port 8 of the plurality of I/O ports on the physical interface card 204, wherein the selected port 8 of the plurality of I/O ports 8 210 212 214 on the physical interface card 204 receives the plurality of packets. The selected port 8 of the plurality of I/O ports 8 210 212 214 may utilize optical communication technologies so the electrical signals may need to be converted to optical signals. The point light source driver 5 may assist in converting electrical signals to optical signals by providing an output signal to the point light source representing the optical signals to transmit to represent the received plurality of packets. The point light source 3 may transmit a point light beam to the optical subassembly 6, and the optical subassembly 6 may provide the incident light ray to the photodetector 4 to monitor the average output power and the extinction ratio of the point light source 3. As discussed previously, the photodetector 4 may utilize the information from the incident ray to send average output power and extinction ratio data to the point light source driver 5 which controls the output of the point light source 3.

Figure 2:
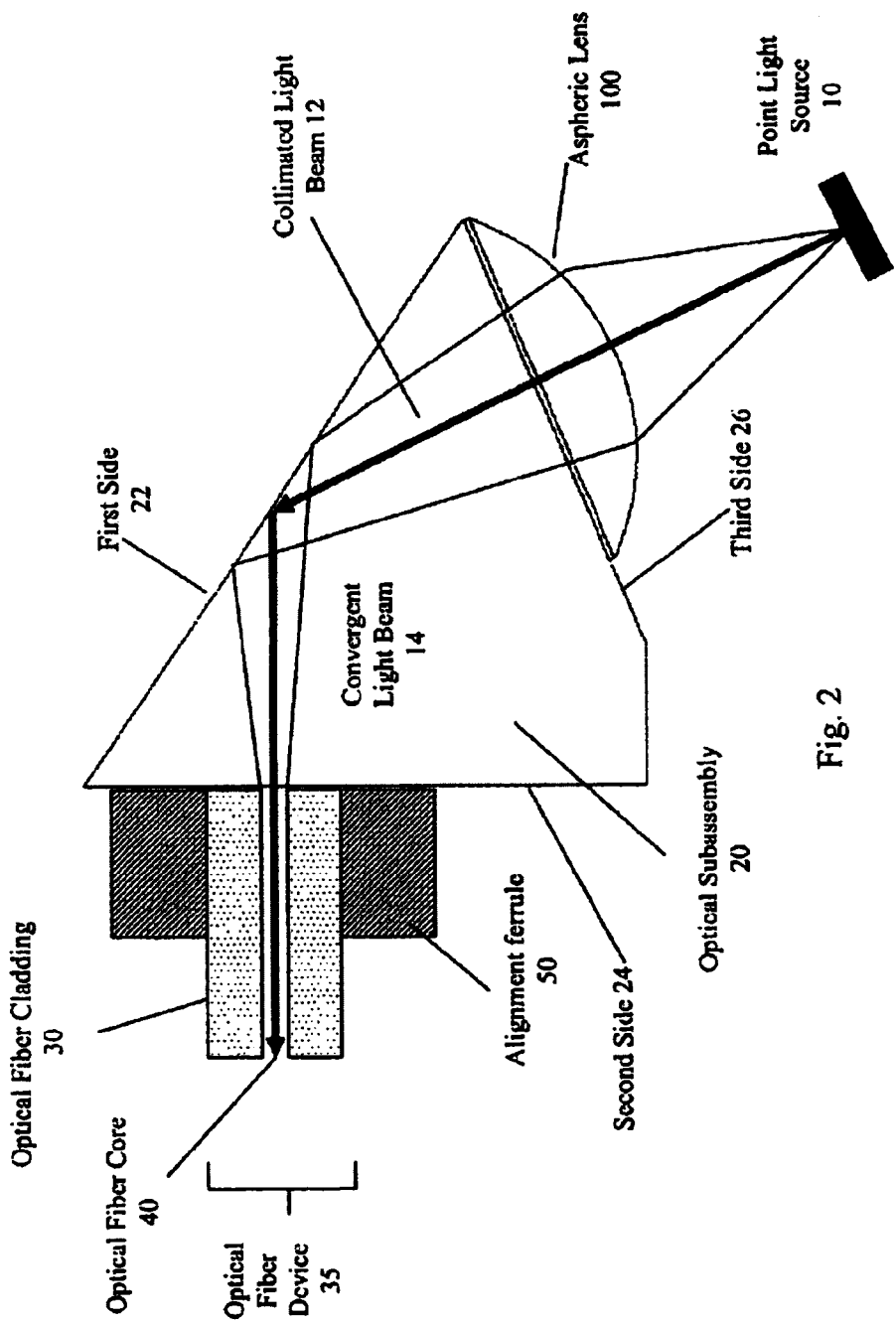
FIG. 2 illustrates an optical subassembly according to an embodiment of the present invention.

FIG. 2 illustrates an optical subassembly according to an embodiment of the present invention. The optical subassembly 20 may include a first side 22, a second side 24, and a third side 26. The optical subassembly 20 may be composed of an optically transparent plastic, for example. A point light source 10 may transmit a collimated light beam 12 through the third side 26 of the optical subassembly 20. An aspheric lens 100 may be attached to the exterior surface of the third side 26 of the optical subassembly 20. The focal length of the lens 100 may be selected to produce an image spot with a numerical aperture matching the numerical aperture of an optical fiber core 40. The chief ray of the collimated light beam 12 may enter the axis of symmetry of the aspheric lens 100.

The collimated light beam 12 may travel through the aspheric lens 100 and third side 26 of the optical subassembly to an interior surface of a first side 22 of the optical subassembly 20 where it is completely reflected and becomes a convergent light beam 14. The interior surface of the first side 22 of the optical subassembly 20 may be a total internal reflection (TIR) surface, which means the collimated light beam 12 is totally reflected to create the convergent light beam 14. The convergent light beam may travel through a second side 24 of the optical subassembly 20 and into a receiving optical fiber device 35. The receiving optical fiber device 35 may include an optical fiber core 40 and optical fiber cladding 30. In the receiving optical fiber device 35, the convergent light beam 14 may be transmitted only into the optical fiber core 40. The optical fiber cladding 30 may enclose the optical fiber core 40 in relation to the optical subassembly 20.

An alignment ferrule 50 may be used to precisely position the optical fiber device 35 at the focal point of the optical subassembly 20. The alignment ferrule 50 may be attached to the optical subassembly 20. Alternatively, the alignment ferrule 50, the optical subassembly 20, and the aspheric lens 100 may be manufactured as one part to minimize alignment inaccuracy. In this embodiment, the optical subassembly 20, the alignment ferrule 50, and the aspheric lens 100 may be made by an injection molding process using, for example, polycarbonate, polyolefin, or polyethylimide.

Figure 3:
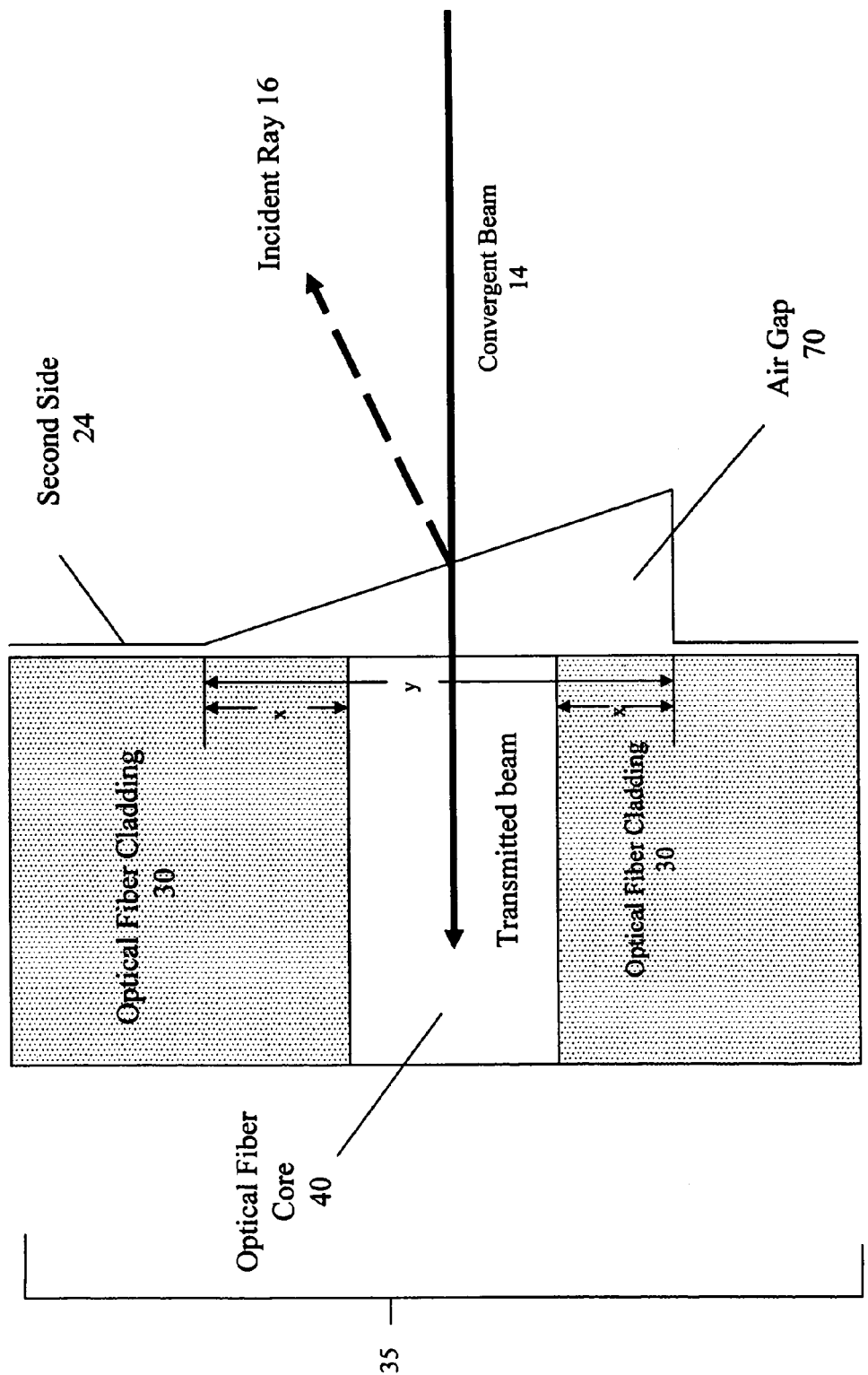
FIG. 3 illustrates a connection of a side of an optical subassembly to a receiving optical fiber device according to an embodiment of the present invention.

FIG. 3 illustrates a second side of an optical subassembly and the receiving optical fiber device according to an embodiment of the optical communication system. The second side 24 of the optical subassembly 20 may be aligned with the optical fiber device 35 in a manner to create an air gap 70 between a section of the second side 24 of the optical subassembly 20 and a section y of the optical fiber device 35. Illustratively, the air gap may be a wedge-shaped air gap. For example, as illustrated in FIG. 3, the wedge-shaped air gap 70 may be of a length that is equal to the width of the optical fiber core and two sections x of the optical fiber cladding 30.

The creation of the wedge-shaped air gap 70 may create an incident ray 16 of the convergent light beam 14 in accordance with Fresnel reflection based on an index of refraction mismatch between air and the plastic of which the optical subassembly 20 is composed. In one embodiment, the incident ray 16 of the convergent light beam 14 may be reflected almost 180 degrees relative to the convergent light beam 14. The angle between the incident ray and the convergent light beam is dictated by the angle of the wedge-shaped air gap 70.

Figure 4:
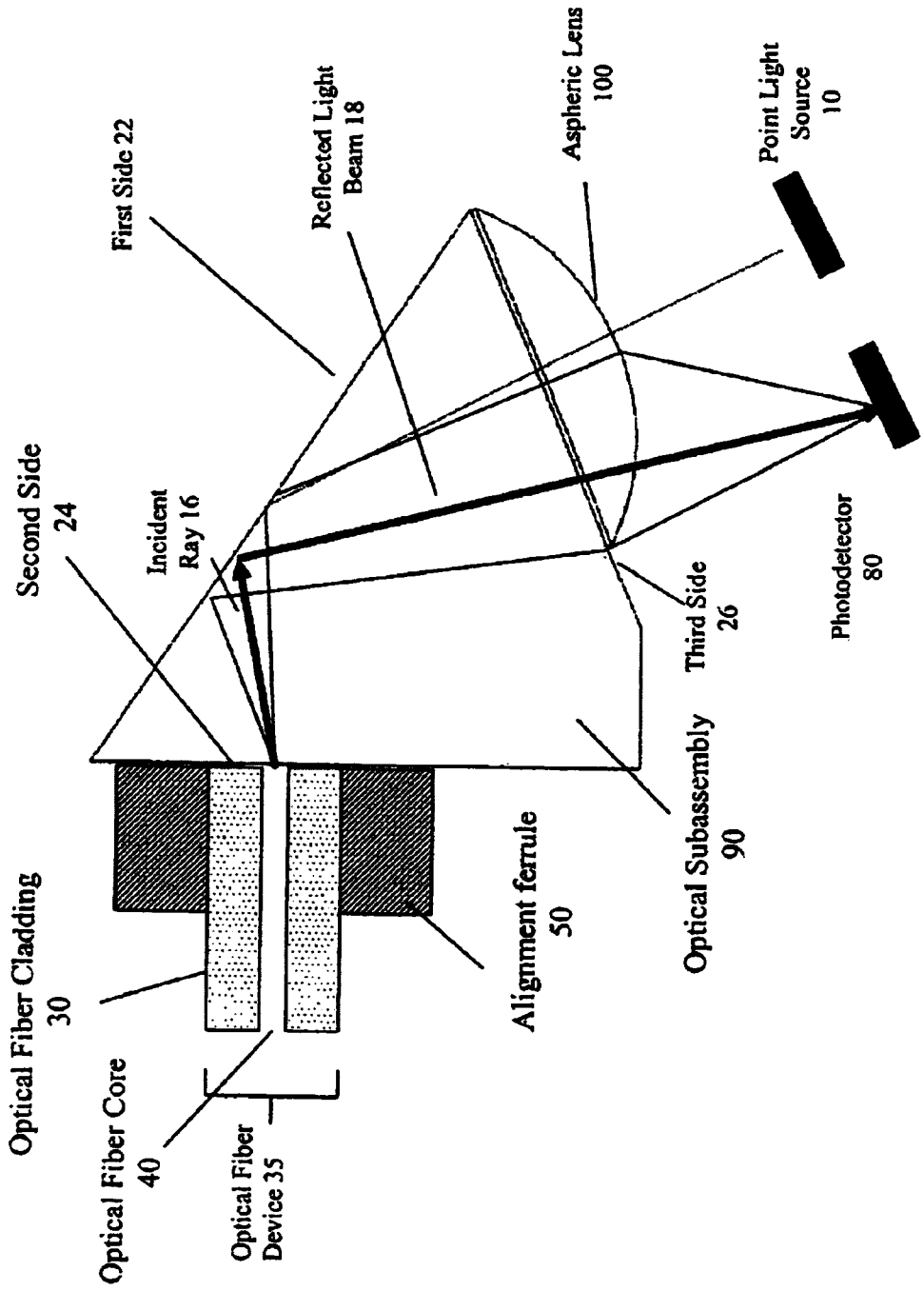
FIG. 4 illustrates a path of an incident ray of a reflected light wave and a path of a reflected incident wave according to an embodiment of the present invention.

FIG. 4 illustrates a path of an incident ray of the convergent light beam and a path of a reflected light beam according to an embodiment of the optical communication system. The incident ray 16 of the convergent light beam 14 may be directed to the interior surface of the first side 22 of the optical subassembly 20. Because the interior surface of the first side 22 of the optical subassembly 20 may be a TIR surface, the incident ray 16 of the reflected light beam may completely reflect off the interior surface of the first side 22 of the optical subassembly 20 and become a reflected light beam 18, as illustrated in FIG. 4.

The reflected light beam 18 may travel through a third side 26 of the optical subassembly 20. The aspheric lens 100 may be attached to the exterior surface of the third side 26 of the optical subassembly 20. The lens 100 may focus the reflected light beam 18 onto a photodetector 80. The lens 100 may bring the reflected light beam 18 to a focus so that the reflected light beam 18 is brought to a relatively large fluence. The focus of the reflected light beam 18 may align with the receiving area of the photodetector 80 to maintain the relatively large fluence. Because the reflected light beam maintains a relatively large fluence, a small area photodetector 80 may be used. This configuration may allow the photodetector 80 to track the high speed modulation of the reflected light beam 18. The photodetector 80 may receive the reflected light beam 18 and determine the average output power of and the extinction ratio of the reflected light beam 18, which should be equivalent to the average output power and the extinction ratio of the collimated light beam 12 from the point light source 10 (see FIG. 2). The photodetector 80 may provide this information to the point light source driver 5 (see FIG. 1) in order to correct any changes that may have occurred in the point light source's output power or extinction ratio due to age or change in temperature operating characteristics.

Figure 5:
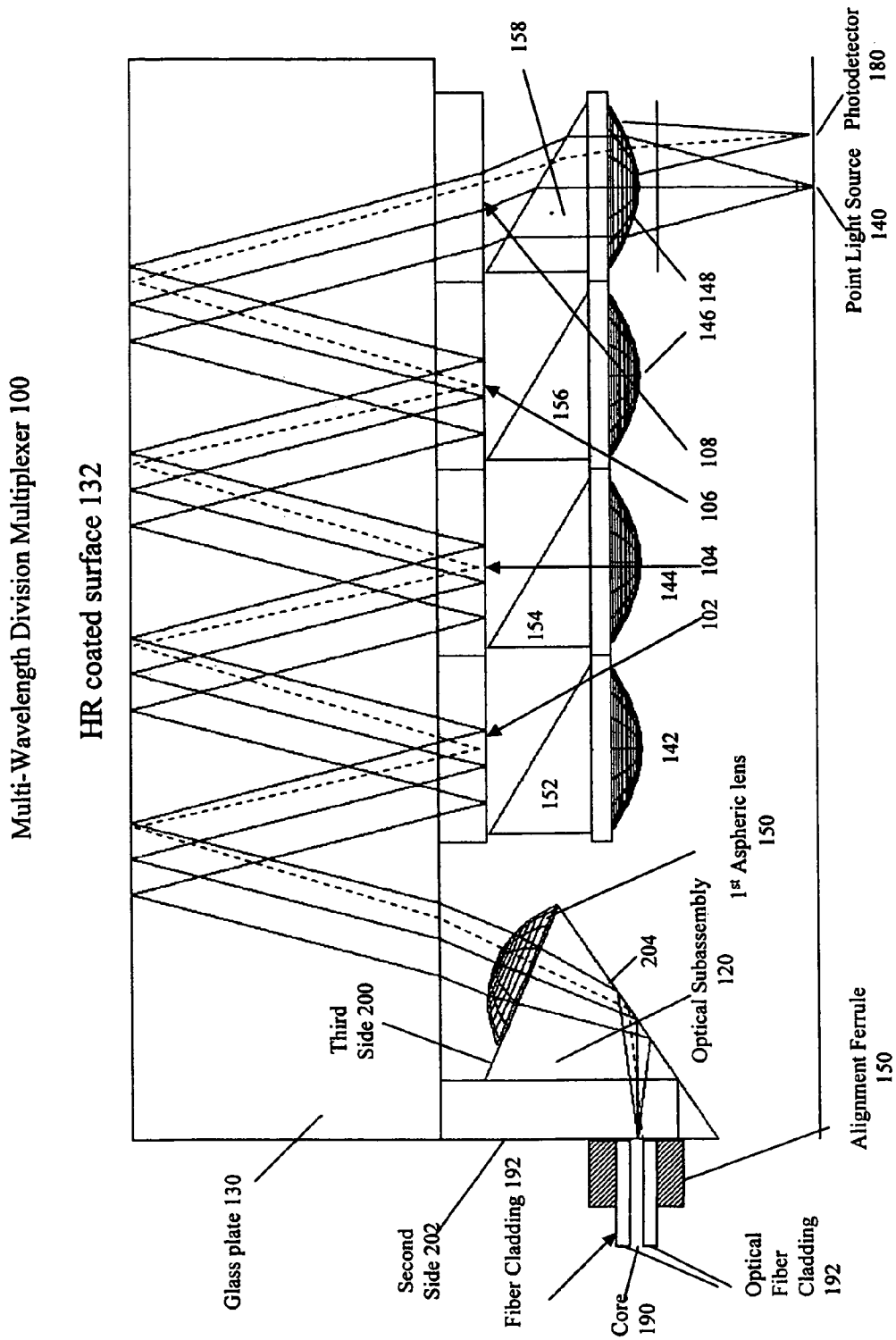
FIG. 5 illustrates a multi-channel wavelength division multiplexer with fiber optic input according to embodiments of an optical communication system.

FIG. 5 illustrates a multi-channel wavelength division multiplexer with fiber optic input according to an embodiment of an optical communication system. The multi-channel wavelength division multiplexer 100 may utilize a plurality of thin film filters (TFFs) 102, 104, 106, and 108 in a "zig-zag" scheme to perform channel separation. The multi-channel wavelength division multiplexer, or transmitter, 100 may include an optical subassembly 120, a glass plate 130, a plurality of TFFs 102 104 106 and 108, a plurality of point light sources 140 (only one shown), a first aspheric lens 150, a plurality of second aspheric lenses 142 144 146 and 148, a plurality of focusing optical subassemblies 152 154 156 and 158, and a plurality of photodetectors 180 (only one shown). To simplify description, only one point light source 140 and one photodetector 180 operation are illustrated. Light beams from point light source 140 may be collimated, re-directed into a zig-zag optical path, as illustrated by FIG. 5, and finally coupled into an optical fiber core 180. In an embodiment, the point light source 140 may be located in a position below the optical subassembly 120 and the plurality of focusing optical subassemblies 152 154 156 and 158.

The plurality of point light sources 140 (rest not shown) and the plurality of TFFs 102 104 106 and 108 may have non-overlapping passbands, with each passband centered at the emitting wavelength of the corresponding point light source 140.

A point light source 140 may be positioned beneath a second aspheric lens 148. In FIG. 5, only one light beam (solid line), one point light source 140, one reflected light beam (dotted lines), and one photodetector 180 are shown for clarity. The light beam emitted from the point light source 140 may pass through its corresponding second aspheric lens 148. A focusing subassembly 158 corresponding to the second aspheric lens 148 redirects the collimated light beam into the glass plate 130. The plurality of TFFs 102 104 106 and 106 may be attached to a bottom surface of the glass plate 130 as illustrated in FIG. 5. The light beam may pass through the corresponding TFF 108 because the emitting wavelength of the point light source 140 corresponds to the passband of TFF 108. The rest of the plurality of point light sources pass through the remaining corresponding TFFs 102 104 106 108, respectively, in a similar fashion. Because the plurality of TFFs 102 104 106 108 have non-overlapping passbands, different wavelength components are extracted from the plurality of collimated light beams from the plurality of point light sources. Inside the glass plate 130, the collimated light beam from point light source 140 (solid line) may travel in a "zig-zag" optical path while being reflected by the HR coated surface 132 and the remaining TFFs 102 104 and 106. The remaining TFFs 102 104 and 106 may not allow the collimated light beam from point light source 140 to pass because the emitting wavelength of the point light source 140 does not correspond to the passband of the remaining TFFs 102 104 and 106. After leaving the glass plate 130, the collimated light beam may be coupled into an optical subassembly 120 through the first aspheric lens 150.

The collimated light beam may be directed through the aspheric lens 150 and through a third side 200 of the optical subassembly 120 to an interior surface of a first side 204 of the optical subassembly 120. The interior side of the first side 204 may be a TIR surface. The collimated light beam may reflect off the first side 204 and become a convergent light beam which is directed off the first side 204 of the optical subassembly 120 through a second side 202 of the optical subassembly 120 and into the optical fiber core 190. The optical subassembly 120 may be configured so that where the second side 202 of the optical subassembly connects to the optical fiber device 190 an air gap may exist. (not shown). In one embodiment, a wedge-shaped air gap creates an incident ray (dotted line) of the convergent light beam in accordance with Fresnel reflection based on an index of refraction mismatch between air and the plastic of which the optical subassembly 120 is composed. The incident ray of the convergent light beam reflects back towards the interior surface of the first side 204. The interior surface of the first side 204 reflects the incident ray of the convergent light beam. The reflected light beam may pass through the third side 200 of the optical subassembly 120 and the first aspheric lens 150 to the glass plate 130. The reflected light beam may travel in a "zig-zag" pattern alternately reflecting off the HR coated surface 132 and the plurality of TFFs 102 104 and 106 (whose passband does not equal the emitting wavelength of the point light source 140 which originally generated the reflected light beam). If the reflected light beam is of the wavelength that is allowed to pass through the corresponding TFF, in this case TFF 108, the reflected light beam (dotted line) travels through the associated TFF 108, the associated focusing optical subassembly 158, and the associated second aspheric lens 148. The associated aspheric lens 148 focuses the reflected light beam onto the viewing portion of the photodetector 180, which monitors the output power and the extinction ration of the point light source 140.

Figure 6:
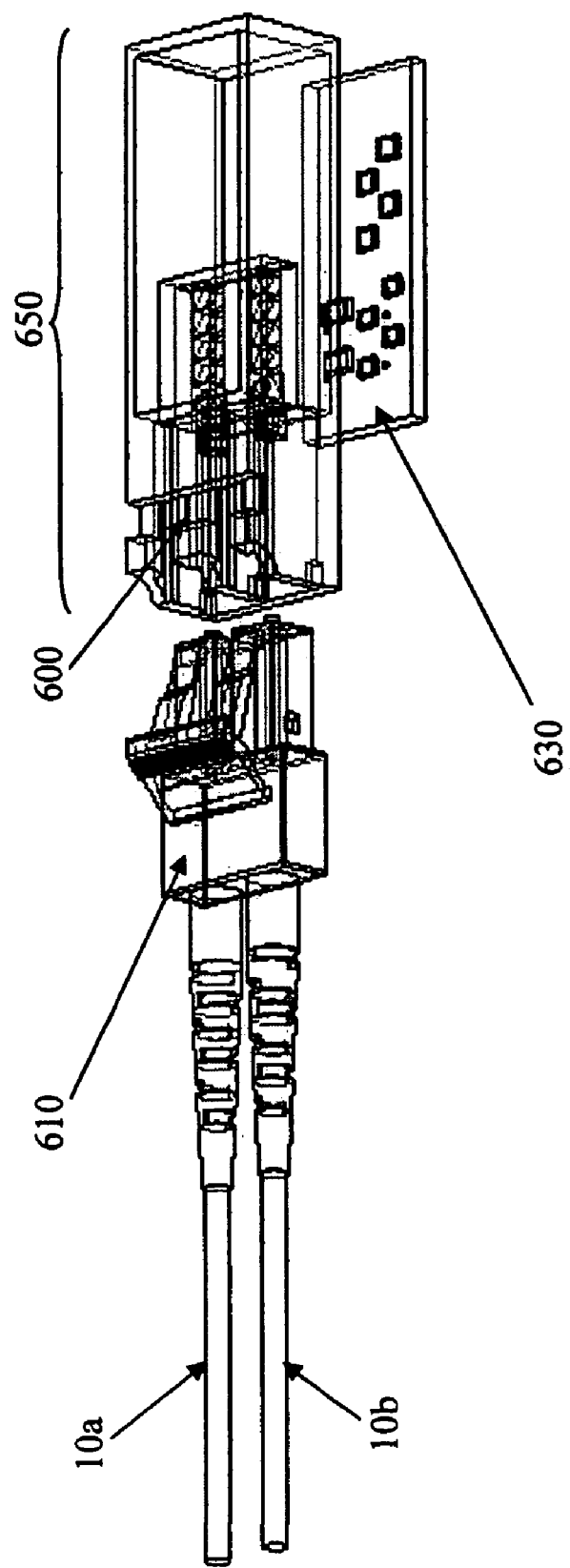
FIG. 6 shows a complete transceiver module according to an embodiment of the present invention.

FIG. 6 shows a complete transceiver module according to an embodiment of the present invention. The complete transceiver module includes a dual fiber optic connector 610, an injection-molded optical assembly 650, a printed circuit board (PCB) 630, and a metal shield for minimizing electromagnetic interference (not shown). Optical fibers 10a, 10b are connected to the dual fiber connector 610. One optical fiber in the dual connector 610 is for the receiver, and the other one is for the transmitter. As described, the optical assembly 650 is preferably a one-piece injection-molded optical subassembly with a connector housing 600. The dual fiber connector 610 slides into the connector housing 600. The PCB 630 is aligned with the one-piece injection-molded optical subassembly in the optical assembly 650. On the PCB 630, there are laser sources, photodetectors, chips for processing electrical signals, other circuitry, etc. To aid the alignment, a ledge structure is provided in a plane parallel to the plane tangential to, and passing through, the apex of the aspheric lenses of the collimating and optical subassemblies in the optical assembly 650. The ledge structure allows the PCB 630 to be inserted and to be parallel to the aspheric lenses within a few microns of tolerance.

While the description above refers to particular embodiments of the present invention, it will be understood that many modifications may be made without departing from the spirit thereof. The accompanying claims are intended to cover such modifications as would fall within the true scope and spirit of embodiments of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. An optical communication system, comprising:
a receiving optical fiber device including an optical fiber core and optical fiber cladding;
a point light source to generate and transmit a point light beam; and
an optical subassembly adjacent to the receiving optical fiber device, including
an interior surface of a first side to receive the point light beam and to create a convergent light beam, the interior surface of the first side being a reflective surface, and
a second side that the convergent light beam travels through to the receiving optical fiber device, wherein the second side is configured and positioned to create a wedge-shaped air gap, wherein the wedge-shaped air gap creates an incident ray of the convergent light beam, and the incident ray is directed towards the interior surface of the first side.

2. The optical communication system of claim 1, wherein the incident ray of the convergent light beam is reflected from the interior surface of the first side of the optical subassembly to create a reflected light beam.

3. The optical communication system of claim 2, wherein the reflected light beam travels through a third side of the optical subassembly.

4. The optical communication system of claim 1, further including a point light source driver to provide current to the point light source in order to control the point light beam.

5. The optical communication system of claim 4, further including an output port to connect the receiving optical fiber device to a transmission optical fiber device to allow the convergent light beam to be transmitted to another optical communication system or over an optical transmission medium.

6. The optical communication system of claim 5, wherein the output port is located in a routing device.

7. The optical communication system of claim 5, wherein the output port is located in a network switch.

8. The optical communication system of claim 1, wherein the optical subassembly is plastic.

9. An optical subassembly, comprising:
an interior surface of a first side to create a convergent light beam, the interior surface of the first side being a reflective surface; and
a second side that the convergent light beam travels through, wherein the second side is configured and positioned to form a wedge-shaped air gap, and the wedge-shaped air gap creates an incident ray of the convergent light beam, wherein the incident ray is directed towards the interior surface of the first side.

10. The optical subassembly of claim 9, wherein the incident ray is directed to reflected from the interior surface of the first side to create a reflected light beam.

11. The optical subassembly of claim 10, wherein the reflected light beam travels through a third side of the optical subassembly.

12. The optical subassembly of claim 9, wherein the optical subassembly is an optically transparent plastic.

13. A method of monitoring a point light source output power and extinction ratio, comprising:
creating a convergent light beam by reflecting a collimated light beam wave off an interior surface of a first side of an optical subassembly, the interior surface of the first side being a reflective surface; and
creating an incident ray of the convergent light beam by utilizing a wedge-shaped air gap in a second side of the optical subassembly to create the wedge-shaped air gap, wherein the incident ray is directed towards the interior surface of the first side of the optical assembly.

14. The method of claim 13, further including creating a reflected light beam by reflecting the incident ray of the convergent light beam off the interior surface of the first side of the optical subassembly.

15. The method of claim 14, wherein the reflected light beam travels through a third side of the optical subassembly.

16. The method of claim 13, wherein the optical subassembly is a optically transparent plastic.

17. The optical communication system of claim 1, wherein the incident ray is created by a Fresnel reflection based on the index of refraction mismatch between air of the air gap and the plastic of the optical subassembly.

18. The optical subassembly of claim 9, wherein the incident ray is created by a Fresnel reflection based on the index of refraction mismatch between air of the air gap and the plastic of the optical subassembly.

19. The method of claim 13, wherein the incident ray is created by a Fresnel reflection based on the index of refraction mismatch between air of the air gap and the plastic of the optical subassembly.

20. The optical communication of claim 1, wherein a third side of the optical subassembly is next to the point source and the first side is not next to a point light source.

21. The optical subassembly of claim 9, wherein a third side of the optical subassembly is next to a point light source and the first side is not next to a point light source.

* * * * *